C. HOWARD.
METHOD OF VULCANIZING AND DRYING WOOD.
No. 11,309. Reissued Feb. 21, 1893.
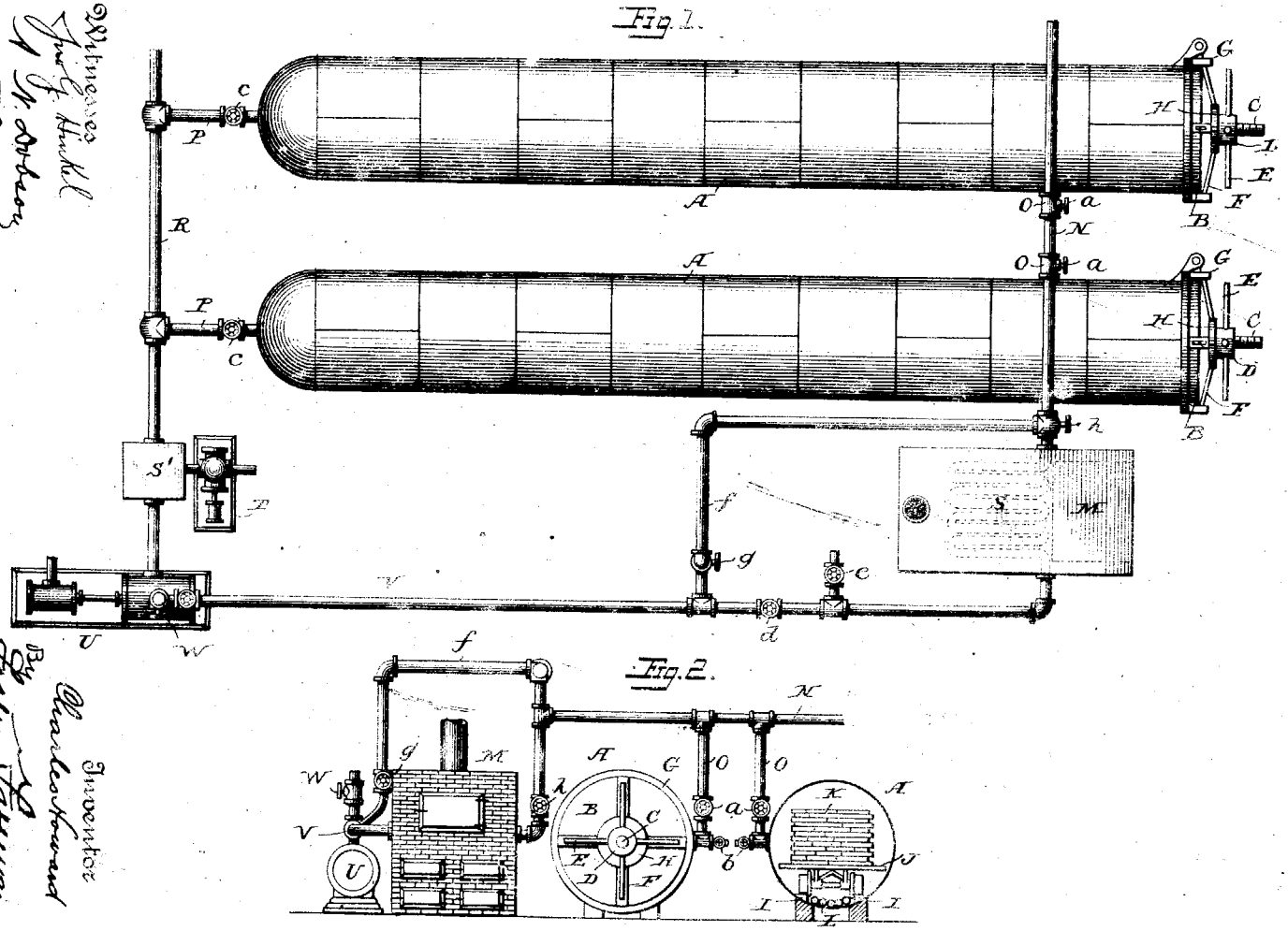
Witnesses
Jno. G. Hinkel
A. N. Dobson
Inventor
Charles Howard
By Foster Freeman
Attorneys

UNITED STATES PATENT OFFICE.

CHARLES HOWARD, OF NEW YORK, N. Y.

METHOD OF VULCANIZING AND DRYING WOOD.

SPECIFICATION forming part of Reissued Letters Patent No. 11,309, dated February 21, 1893.

Original No. 465,975, dated December 29, 1891. Application for reissue filed January 9, 1893. Serial No. 457,833. Patented in England December 29, 1891, No. 22,692; in France December 29, 1891, No. 218,361, and in Canada February 6, 1892, No. 38,238.

*To all whom it may concern:*

Be it known that I, CHARLES HOWARD, a citizen of the United States, and a resident of the city, county, and State of New York, have invented certain new and useful Improvements in Methods of Vulcanizing and Drying Wood, of which the following is a specification.

My invention which has been patented in Great Britain, No. 22,692, dated December 29, 1891; in France, No. 218,361, dated December 29, 1891, and in Canada, No. 38,238, dated February 6, 1892, relates especially to an improved method of vulcanizing and drying wood, and has for its object the provision of a method and means for carrying the same into practice, whereby the wood treated will be thoroughly vulcanized and dried, while at the same time it will be subjected to a much lower temperature than has heretofore been employed, thereby preserving the fiber of the wood and preventing injury of the same, while the vulcanizing and drying are very effectually accomplished.

To attain the desired end my invention consists in inclosing the wood to be treated in an air-tight cylinder or chamber while cold, exhausting the air from the chamber, and then subjecting the contents of the chamber to the action of dry heated air, all of which will be hereinafter fully described.

In the accompanying drawings, I have shown one way of carrying out my method, although it will at once be apparent to those skilled in the art to which my invention relates that the apparatus employed may be greatly varied and modified without departing from the spirit of my invention.

In the drawing Figure 1 is a plan view of an apparatus designed for carrying my invention into practice; and Fig. 2 is a front elevation of said apparatus, looking from the right of Fig. 1.

Like letters of reference wherever they occur indicate corresponding parts in both the figures.

A, A, are cylinders made of any approved material and of any desired shape and size. I have shown two of said cylinders; but one or any number may be employed.

B is a door arranged to fit the end of the cylinder air-tight, said door being held in place by means of a screw C, which passes from the door through a threaded hub D, provided with manipulating arms E.

F are arms, which engage with the flange G and ring H, encircling the screw C, and against which the hub D bears when the parts are all in place. Within the cylinders or chambers A are tracks I, upon which cars J run for the reception of the wood or lumber K to be treated, as particularly shown in Fig. 2. L are heating-pipes located in the chambers A.

M is a furnace or stove having a coil S of heating pipe therein, which communicates at one side with a pipe N, having branches O, which connect with the cylinders A.

*a* represent valves in the branches O, and *b* are other valves which open the communication between the cylinders and the outer atmosphere.

P P are pipes connected to the back ends of the cylinders A, also provided with regulating valves *c*. Pipes P connect with a pipe R, which leads to and through a condenser S.

T is a pump arranged to circulate cold water in said condenser.

U is an air-pump provided with a pipe V, which leads to the coil in the furnace M and is provided with an exhaust-valve W.

*d* is a valve for closing pipe V, at a point beyond a branch pipe *f* leading around the furnace and provided with regulating valves *g* and *h*.

*e* is a valve of an inlet pipe connecting with the pipe V beyond the connection with the branch *f*.

When constructed and arranged in accordance with the foregoing description, this apparatus is employed for carrying my process or method into effect as follows: Wood or lumber being placed upon the cars within the cylinders or chambers, the doors are closed tightly, and the valves between the furnace and the cylinders are also closed. The air-pump is then started, creating a vacuum within the cylinders. After exhausting to the required extent and for the proper time, the proper valves are opened and heated fluid is admitted to the pipes L and the heat is maintained until the contents of the chambers are uniformly heated to the desired degree. As is well known water will boil in a vacuum at a much lower temperature than in the open atmosphere, and I utilize this fact by creating the vacuum and applying the heat, as above set forth. The result is that the sap, &c., within the wood are acted upon by the heat at a temperature far below the boiling point in the atmosphere, having the same result as the high temperature, and by thus using the low temperature in vulcanizing, the fiber of the wood is in no way injured, as is often the case in the methods heretofore employed for this purpose, and as less heat is required by my process the attendant expense is materially reduced. If it is desired to cause of circulation through the furnace, the connections permit this to be obtained. Thus while exhausting at P the valve *e* is partly opened and the valves *a* opened and a portion of fresh air is admitted to the pipes S and flows to the cylinders, or the valve *e* may remain closed and the valve *d* be opened to permit a limited portion of air from the pump U to flow to the pipes S. In either case hot air is admitted and circulated, but without destroying the vacuum.

If it is desired the furnace connections may be cut out by closing the valves *d*, *e*, *h*, and passing the colder air to the cylinders by means of the branch pipe *f*. It will thus be seen that my improved method of vulcanizing and drying wood admirably answers the uses and purposes for which it is intended.

Having now fully described my invention, what I claim as new, and desire to secure by Letters Patent, is—

1. The herein described method of vulcanizing wood, which consists essentially, in inclosing the wood to be treated in a chamber while cold, creating a vacuum within said chamber, and thereafter applying heat to the wood while in said chamber and vacuum and while the vacuum is maintained, substantially as set forth.

2. The herein described method of vulcanizing and drying wood, which consists essentially, in inclosing the wood to be treated in a chamber, creating a vacuum within said chamber, applying heat to the wood while said vacuum is maintained, and circulating the air and carrying the vapor through said chamber and the vacuum producing mechanism, substantially as set forth.

3. The herein described method of vulcanizing and drying wood, which consists in first inclosing the wood in a cold condition in a chamber, then drawing the moisture of the external layers of the wood to the surface by the action of a vacuum, heating said chamber, then admitting heated air to the chamber and then removing the external water and vulcanizing the wood and contained sap by a continuous circulation of the dry heated air through the chamber under a vacuum, the absorbed water being removed from the air by condensation, substantially as set forth.

In testimony whereof I have signed my name to this specification in the presence of two subscribing witnesses.

CHARLES HOWARD

Witnesses:
GEORGIA P. KRAMER,
A. N. DOBSON.